Patented Nov. 28, 1950

2,532,197

UNITED STATES PATENT OFFICE 2,532,197

THERMOPLASTIC COMPOSITION

William Rowe, Lewiston, Maine, assignor to Bonafide Mills, Inc., Lisbon, Maine, a corporation of Maine No Drawing. Application February 17, 1948, Serial No. 9,011

3 Claims. (Cl. 106—281)

This invention relates to a thermoplastic composition.

In general the object of the invention is to provide a novel and improved thermoplastic composition which may be used with advantage in the production of various commercial products including coated sheets suitable for wall or floor coverings, for the production of desk tops and for various surface coverings such as the surfaces surounding sinks and wash bowls, for the production of tile, and in general for the production of coated surfaces and other articles for various purposes where resistance to water, alkali, oil and grease is important.

With this general object in view, and such others as may hereinafter appear, the invention consists in the thermoplastic composition hereinafter described and particularly defined in the claims at the end of this specification.

In general, the present thermoplastic composition utilizes as a base a drying pitch preferably of vegetable origin but which for some purposes may comprise drying pitches of animal or marine origin, or combinations of vegetable, animal or marine pitches. This drying pitch is blended at a moderate temperature, preferably from 200 to 300° F. with a viscous petroleum product consisting principally of polymerized olefinic hydrocarbons, characterized by a high degree of unsaturation, and which is substantially non-acidic and non-saponifiable in nature. The unsaturated petroleum polymer materially assists the drying the curing of the drying pitch so that the improved thermoplastic composition, and products produced therefrom may be cured at a moderate temperature, as for example of 150 to 200° F. in from two to five days, whereas curing operations with other prior comparable thermoplastic compositions embodying drying pitches have required materially longer periods of time to effect satisfactory curing to a point where the product could be handled commercially. Driers may or may not be added with the polymer to accelerate the curing rate, such as lead, manganese and cobalt driers. The present thermoplastic composition finds particular use for many of the uses for which thermoplastic materials have been used and has the important advantage of being highly resistant not only to water but to acids, alkalies, mineral oil and household fats, and accordingly may be used with advantage for the production of products, and in covering surfaces which are exposed to such conditions.

The present thermoplastic composition embodying the drying pitch and the compatible unsaturated petroleum polymer above described may have incorporated therein various pigments to impart color thereto, and while any suitable pigment may be utilized it has been found that by reason of the relatively low temperature required for effecting the blending of the pitch and polymer the range of pigments which may be used and still satisfactorily hold their color is much wider than the range of pigments available for use with prior comparable thermoplastic compositions requiring temperatures for proper blending of from 400 to 500° F.

The unsaturated petroleum polymer which is relatively viscous in nature possesses a molecular weight in the range of from 200 to 600. It has a specific gravity of approximately 1.0, the polymers from some commercial oil refineries having a specific gravity slightly exceeding 1.0, and those from other sources having specific gravities slightly less than 1.0. The saponification and acid values of these unsaturated polymers of the character described are relatively low, the saponification numbers of many being in the neighborhood of 1.0, and on the average never exceeding 5, while the average acid numbers of the many samples tested did not exceed 1.0. The iodine numbers of these polymers varied from 80 up and in general ranged between 100 and 200.

These unsaturated olefinic hydrocarbon polymers may be obtained upon the open market from all of the major oil companies, some being produced by processes which have been kept secret and others being sold under various trade names.

The following examples indicate the characteristics of a petroleum polymer which may be used in producing the present thermoplastic composition. A polymer obtained on the open market from Enjay Co. Inc., New York, New York, is represented by the producer to be a heat reactive aromatic-type olefinic hydrocarbon polymer which is produced during refining of petroleum and is highly unsaturated and dries by both oxidation and polymerization. Its physical properties include Specific gravity 60°/60° F _____ 1.00–1.02
Iodine No. (Wijs) _____(minimum) __ 190
Saponification No_____ 1–2
Diene No. (maleic anhydride value)
                          (approximately) __ 10
Acid No._____(approximately) __ 0.2

The polymer may be considered a short oil length resin, and it will be observed that the saponification value and the acid number of each are extremely low so that upon subsequent dispersion with the pigments which may be used to color the thermoplastic composition no reaction takes place between the polymer and the pigments.

*Example 2.*—The Advance Solvents Chemical Corporation, New York, New York, manufactures and markets a polymer of the type which may be successfully used in producing the present thermoplastic composition and which is derived from selectively extracted petroleum products and is of an unsaturated heat reactive nature. The specific gravity at 60° F. was 1.028 and the bromine value from 65 to 85. The sample tested had no saponification or acid value.

*Example 3.*—The Shell Oil Company, San Francisco, California, markets a number of complex dark amber colored hydrocarbons which are unsaturated and of a predominantly aromatic structure. These hydrocarbons at ordinary temperatures range from viscous liquids to low softening point resins and the unsaturated nature of the hydrocarbons permits oxidation and the formulation of non-volatile films. A typical analysis of such hydrocarbons is as follows:

In addition to its use for the production of coated sheets the present thermoplastic composition may be used as a protective covering for desk tops, surfaces surrounding kitchen sinks, for the production of tile, and for the production of various other commercial articles wherein it is desirable to provide a protective surface which is resistant to water, acids, alkalies, mineral oils and fats. The viscosity or plasticity of the composition may be controlled by regulating the proportion of filler to vehicle and the composition may be used as a mastic and troweled or otherwise applied to a surface in either a heated or a cold condition, and when used for the production of such things as tile the composition having the proper amount of filler may be sheeted-out and cut into tile while in a moderately heated condition, it being understood that the sheeted-out material is preferably cured in a heated chamber at from 150 to 200° F. for a period of from two to five days. When it is desired to produce articles of a denser harder nature the curing period may be extended somewhat. Of the various vegetable, animal and marine pitches which are commercially avial-

|  | Polymer 1 | Polymer 2 | Polymer 3 | Polymer 4 | Polymer 5 |
|---|---|---|---|---|---|
| SP Gravity 20° C./4° | 1.010 | 1.012 | 1.041 | 1.051 | 1.072 |
| Iodine No. (Wijs) | 96 | 84 | 107 | 105 | 113 |
| Acid No | 0.48 | 0.0 | 0.34 | 0.62 | 0.0 |
| Saponification No | 3.4 | 0.4 | 1.1 | 4.7 | 4.2 |
| Av. Molecular Weight | 271 | 322 | 322 | 349 | 444 |

*Example 4.*—The Pure Oil Company of Chicago, Illinois, markets an unsaturated viscous liquid of petroleum origin possessing drying properties similar to so-called drying oils and classified chemically as being composed principally of polymerized olefinic hydrocarbons. It has the following approximate specifications:

Specific gravity 60°/60° F _____ 0.993
Iodine No. (Wijs modified) (minimum) ___ 200
Saponification No _____(maximum) __ 1.0
Molecular weight _____(approximately) __ 300

The above examples are illustrative of the various commercially obtainable unsaturated olefinic hydrocarbon polymers suitable for use in accordance with the present invention, it being understood that such polymers may be obtained from any of the larger oil refining companies.

For producing a thermoplastic composition which may be utilized with advantage in producing a coated sheet suitable for use as a wall or floor covering, I prefer to utilize a major proportion of the drying pitch such as a cottonseed pitch and a minor but substantial proportion of the unsaturated hydrocarbon polymer of the character above set forth. The ratio of polymer to pitch may be varied from 10 to 50%, and particularly good results have been obtained utilizing ratios wherein the polymer comprises from 10 to 30% by weight. The ratio of vehicle to filler (mineral filler plus pigment) may be varied between 1 to 1 and 1 to 3.

As above pointed out various pigments may be used and I have experienced good results utilizing: Synthetic iron oxides, black, red, yellow; carbon black, chrome yellow, chrome orange, Molybdate orange, zinc yellow, iron blue, ultramarine blue, Phthalocyanine blue and green, Indanthrine blue, chrome green, Toluidine red, Phospho-Tungstic acid blue and green, organic yellows of the Hansa and Benzidine types.

able for the production of the present thermoplastic composition, I prefer to utilize cottonseed or linseed pitch although talloil pitch may be used with advantage for the production of some products. Compositions embodying mixtures of vegetable, animal or marine pitches may be used, and if found advantageous any of the known plasticizers may be used, such as dehydrated castor oils and other known chemical plasticizers in those compositions of a less thermoplastic nature.

The proportion of vehicle to filler, and also the character of the filler may be varied through substantial ranges depending upon the article that it is desired to produce from the present thermoplastic material. For example, as above stated, in producing a coating composition suitable for producing coated fabrics of the general character of linoleum, it is preferred that the ratio of vehicle to filler (filler and pigment) vary between 1 to 1 and 1 to 3. When, however, articles such as tile are to be produced, higher percentages of filler may be used but in practice in the neighborhood of compositions having 30% of vehicle and 70% of filler have been found satisfactory. Among the fillers which are preferably used in producing tile and similar preformed articles are long fibered asbestos, short-fibered asbestos, silica, talc, whiting, and other mineral fillers.

Having thus described the invention, what is claimed is:

1. A thermoplastic composition comprising the blended product resulting from heating at a moderately elevated temperature not exceeding 300° F. a drying oil pitch and a viscous petroleum polymer in the ratio of polymer to pitch of from 10 to 50%, said petroleum polymer having a molecular weight between 200 and 600 and consisting principally of polymerized olefinic hydrocarbons characterized by a high degree of unsaturation, an iodine number of between 80 and 200 and being substantially non-acid and non-saponifiable, said blended product being substantially free from vulcanizing agents and being capable of curing with more rapidity than the drying pitch, and being highly resistant to moisture, acids, alkalies and mineral oils.

2. A thermoplastic composition comprising the blended product resulting from heating at a moderately elevated temperature not exceeding 300° F. a drying oil pitch and a viscous petroleum polymer in the ratio of polymer to pitch of from 10 to 50%, said petroleum polymer having a molecular weight between 200 and 600 and consisting principally of polymerized olefinic hydrocarbons characterized by a high degree of unsaturation, an iodine number of between 80 and 200 and being substantially non-acid and non-saponifiable, said blended product being substantially free from vulcanizing agents and having incorporated therein a substantial amount of filler and being capable of curing with more rapidity and at lower temperatures than the drying pitch and being highly resistant to moisture, acids, alkalies and mineral oils.

3. A thermoplastic composition as defined in claim 2 wherein the ratio of vehicle to filler is within the range of from 1 to 1 and 1 to 3.

WILLIAM ROWE.

REFERENCES CITED

The following references are of record in the file of this patent:

UNITED STATES PATENTS

| Number | Name | Date |
|---|---|---|
| 2,135,424 | Corkery | Nov. 1, 1938 |
| 2,337,337 | McCluer et al. | Dec. 21, 1943 |
| 2,371,652 | Rostler et al. | Mar. 20, 1945 |
| 2,415,697 | Knowles et al. | Feb. 11, 1947 |
| 2,422,002 | Elwell et al. | June 10, 1947 |
| 2,435,412 | Soday | Feb. 3, 1948 |